United States Patent
Peterson et al.

(10) Patent No.: US 7,827,376 B2
(45) Date of Patent: Nov. 2, 2010

(54) SYSTEM AND METHOD FOR PROTECTING HIDDEN PROTECTED AREA OF HDD DURING OPERATION

(75) Inventors: Nathan J. Peterson, Raliegh, NC (US); Joseph Wayne Freeman, Raleigh, NC (US); Rod David Waltermann, Rougemont, NC (US); Randall Scott Springfield, Chapel Hill, NC (US); Mark Charles Davis, Durham, NC (US); Steven Dale Goodman, Raleigh, NC (US); Howard Jeffrey Locker, Cary, NC (US); Daryl Carvis Cromer, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1155 days.

(21) Appl. No.: 11/168,088

(22) Filed: Jun. 27, 2005

(65) Prior Publication Data

US 2006/0294298 A1     Dec. 28, 2006

(51) Int. Cl.
G06F 12/00   (2006.01)
G06F 13/00   (2006.01)
(52) U.S. Cl. .............. 711/173; 711/100; 711/112; 711/154; 711/163
(58) Field of Classification Search .......... 711/173, 711/100, 112, 154, 163
See application file for complete search history.

(56) References Cited

U.S. PATENT DOCUMENTS

| | | | |
|---|---|---|---|
| 5,410,699 A | 4/1995 | Bealkowski | 395/700 |
| 5,925,129 A | 7/1999 | Combs | 713/300 |
| 5,966,732 A | 10/1999 | Assaf | 711/170 |
| 6,601,152 B1 * | 7/2003 | Uchida | 711/164 |
| 6,691,213 B1 | 2/2004 | Luu et al. | 711/163 |
| 6,711,660 B1 * | 3/2004 | Milne et al. | 711/173 |
| 6,728,830 B1 | 4/2004 | Assaf | 711/112 |
| 6,772,313 B2 * | 8/2004 | Oh | 711/173 |
| 6,779,109 B2 | 8/2004 | Stevens | 713/1 |
| 6,862,681 B2 * | 3/2005 | Cheston et al. | 713/2 |
| 7,065,627 B2 * | 6/2006 | Dayan et al. | 711/173 |
| 2002/0083343 A1 | 6/2002 | Crosbie et al. | 713/201 |
| 2002/0133702 A1 | 9/2002 | Stevens | 713/163 |
| 2002/0133714 A1 | 9/2002 | Sales et al. | 713/200 |
| 2002/0138643 A1 | 9/2002 | Shin | 709/232 |
| 2002/0141594 A1 | 10/2002 | MacKenzie et al. | 380/286 |
| 2002/0159601 A1 | 10/2002 | Bushmitch et al. | 380/277 |
| 2002/0166059 A1 * | 11/2002 | Rickey et al. | 713/200 |
| 2003/0014665 A1 | 1/2003 | Andreson et al. | 713/201 |
| 2003/0023867 A1 | 1/2003 | Thibadeau | 713/200 |
| 2003/0041244 A1 | 2/2003 | Buttyan et al. | 713/172 |
| 2003/0065943 A1 | 4/2003 | Geis et al. | 713/201 |
| 2003/0070099 A1 | 4/2003 | Schwartz et al. | 713/202 |
| 2004/0158698 A1 | 8/2004 | Rothman | 713/1 |

* cited by examiner

Primary Examiner—Tuan V. Thai
(74) Attorney, Agent, or Firm—John L. Rogitz

(57) ABSTRACT

A "setmax" command is issued in BIOS to hide the service area (HPA) of a HDD during normal operation, so that the HPA cannot be accessed or erased inadvertently by the user or by a virus. Pressing a special key (e.g., F11) during booting permits access to the HPA.

18 Claims, 2 Drawing Sheets

SYSTEM AND METHOD FOR PROTECTING HIDDEN PROTECTED AREA OF HDD DURING OPERATION

FIELD OF THE INVENTION

The present invention relates generally to service areas, also known as hidden protected areas (HPA), of hard disk drives (HDD).

BACKGROUND OF THE INVENTION

When a personal computer is turned on, a basic input-output system (BIOS) that is stored in non-volatile solid state memory of the computer is invoked to begin what is known as a "boot" process, in which various initialization chores are undertaken. Among the most important of these chores is the copying of an operating system from disk storage of the computer over into a solid state memory of the computer, for execution of the operating system by the processor of the computer when the computer is being used. When the computer is turned off or when it is "re-booted", the operating system is flushed from the memory. By executing the operating system from the relatively fast memory instead of from the disk, computer operations are accelerated.

Recognizing that activities such as recovery operations and password reset may from time to time be required prior to completing the booting of the O.S. into memory, provisions have been made to allow a user to enter special modes during booting by, e.g., depressing a special purpose key such as the F11 button, which, prior to completion of the boot, assumes the function of causing the computer to enter a special mode. In the special mode various programs may be invoked including, for instance, a limited operating system, referred to as a "secure operating system" and also sometimes referred to in the art as a service O.S. The limited operating system is useful for undertaking limited, "safe" tasks such as password reset, etc.

As understood herein, many current HDDs have hidden protected areas (HPA), typically at the beginning or end of the disk, in which certain data is stored. For example, a HPA can contain a compressed image of the main operating system that is located elsewhere on the disk, so that the user is given the opportunity to recover the main operating system using the compressed version in the HPA in the event that, for instance, the main O.S. becomes corrupted with a virus. The compressed version of the O.S. may be an initial O.S. version or a backup version of the user's computing environment, but in any case it resides in the HPA. When the special key (e.g., F11) is depressed during booting, the user is given access to the HPA for booting the service OS and, thus, gaining access to a backup of the user's OS in a compressed image.

The present invention critically recognizes that if the master boot record (MBR) of the HDD, which contains both executable code and certain disk locations including the disk location of the HPA, is removed, replaced, or corrupted through user error or virus attacks, the HPA is effectively rendered useless. Accordingly, the present invention recognizes a need to protect the HPA during normal operations so that, for instance, if a virus attaches to the executing O.S. and has the purpose of maliciously tampering with the MBR, the HPA remains protected, so that subsequent recovery from the virus using the compressed O.S. in the HPA remains viable. Nonetheless, as discussed above the HPA must be accessible during boot so that its content are available as needed by the user.

SUMMARY OF THE INVENTION

A method includes establishing a service partition on a hard disk drive (HDD). A basic input/output system (BIOS) of a computer and/or the MBR of an associated HDD is configured to issue a command to the HDD not to indicate, to an operating system after the operating system has been booted for normal operation, the presence only of disk areas dedicated to the service partition. The HDD is enabled, however, to indicate the presence of all other disk areas. The method also includes configuring the BIOS (and/or MBR) not to issue the command if, during booting, a special input element such as, e.g., the F11 button, is manipulated by the user to indicate a desire to access the service area.

The command may be a setmax command that instructs the HDD not to indicate the existence of the service area to the O.S. In some non-limiting implementations, if the user manipulates the special input element during booting, the BIOS causes a master boot record (MBR) of the HDD to contain a service partition table entry that points to the service partition. In some implementations the service partition table entry is stored in BIOS, non-volatile memory, or the MBR, and the BIOS or execution code that is part of the MBR can read the location of the service partition table entry and update the partition table within the MBR to contain the service partition entry. If desired, if a partition table in the MBR is full, a last entry of the partition table can be replaced by the service partition table entry, which is then designated as "active". When this happens, the original content of the last entry can be stored in BIOS, non-volatile memory, or the MBR. On the other hand, if a partition table in the MBR is not full, an empty entry of the partition table may be populated by the service partition table entry, which is then designated as "active".

In another aspect, a computer system includes a HDD including a service partition, and a processor accessing a BIOS and MBR of the HDD to boot an operating system (O.S.) on the HDD into a computer memory. The BIOS and/or MBR is configured to issue a setmax command to lock the service partition from being accessed by the O.S. during operation of the O.S., with the setmax command being keyed to the service partition such that only disk sectors associated with the service partition are locked from being accessed.

In yet another aspect, a HDD with a service partition table entry stored in BIOS and/or the MBR of the HDD and loadable under control of BIOS and/or the MBR of the HDD into a master boot record (MBR) of the HDD includes means for issuing a "setmax" command to prevent the service partition table entry from being loaded into the MBR to thereby hide a hidden protected area (HPA) of the HDD during normal operation, so that the HPA cannot be accessed or erased inadvertently by the user or by a virus.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
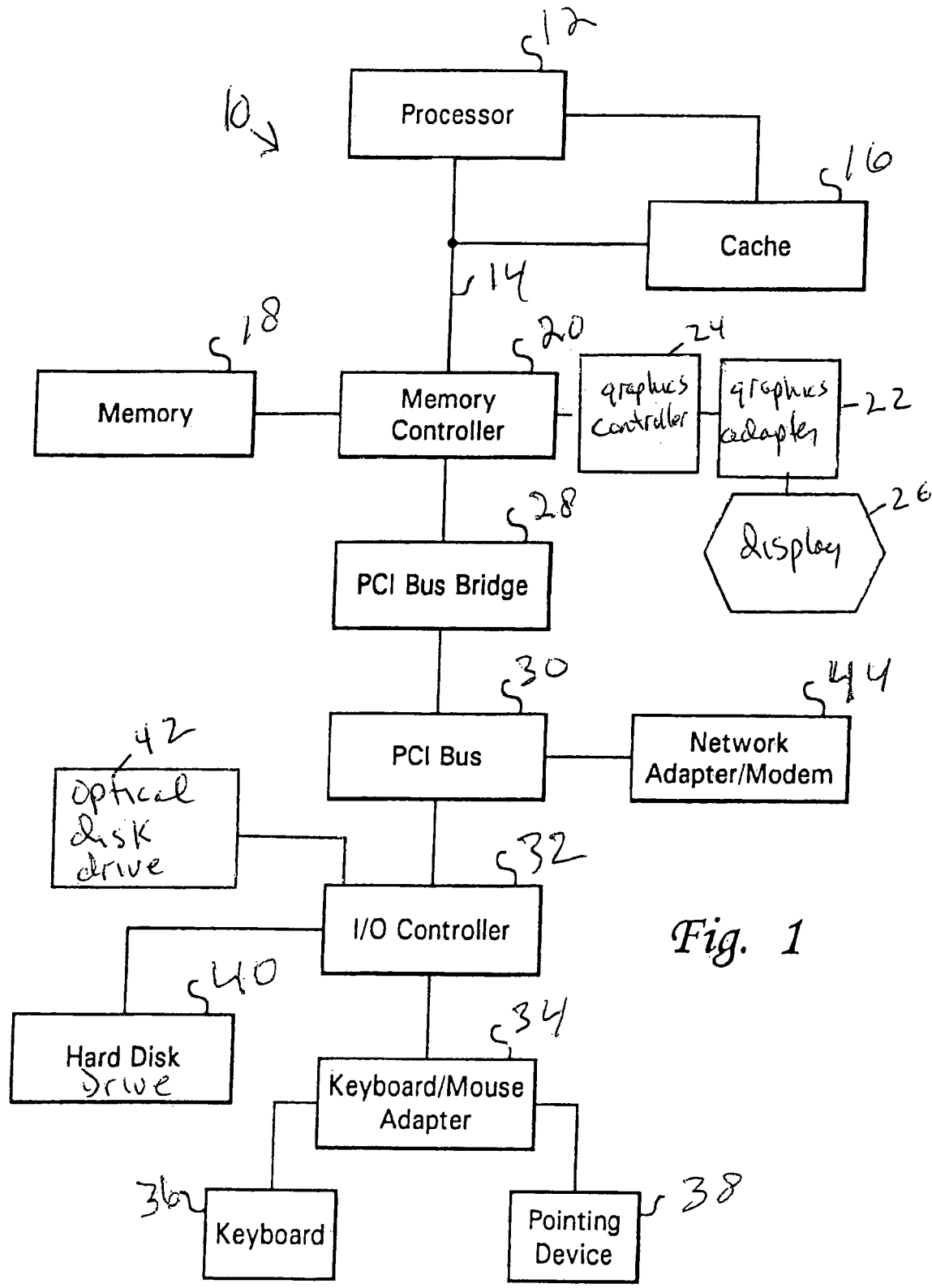
FIG. 1 is a block diagram of a non-limiting computer that can use the present invention.

Referring initially to FIG. 1, a high-level block diagram of a data processing system, generally designated 10, is shown in which the present invention may be implemented. The system 10 in one non-limiting embodiment is a personal computer or laptop computer. The system 10 includes a processor 12, which may be, without limitation, a PowerPC processor available from International Business Machines Corporation of Armonk, N.Y. (or other processors common to the industry). The processor 12 is connected to a processor bus 14, and a cache 16, which is used to stage data to and from the processor 12 at reduced access latency, is also connected to the processor bus 14. In non-limiting embodiments the processor 12 can access data from the cache 16 or from a system solid state memory 18 by way of a memory controller function 20. The cache 16 may include volatile memory such as DRAM and the memory 18 may include non-volatile memory such as flash memory. Also, the memory controller 20 is connected to a memory-mapped graphics adapter 22 by way of a graphic bus controller 24, and the graphics adapter 22 provides a connection for a monitor 26 on which the user interface of software executed within data processing system 10 is displayed.

The non-limiting memory controller 20 may also be connected to a personal computer interface (PCI) bus bridge 28, which provides an interface to a PCI bus 30. Connected to the PCI bus 30 may be an input/output (I/O) controller 32 for controlling various I/O devices, including, e.g., a keyboard/mouse adapter 34 which provides connection to a keyboard 36 and to a pointing device 38, which may be implemented by a mouse, trackball, or the like. Additionally, a hard disk drive 40 is connected to the I/O controller 32. As is known in the art, the HDD 40 includes a controller that can access a master booth record (MBR) which can contain executable code as well as tabular data structures. If desired, an optical disk drive 42, such as a DVD or CD drive, can be connected to the I/O controller 32. In some implementations a network adapter 44 can be attached to the PCI bus 30 as shown for connecting the data processing system 10 to a local area network (LAN), the Internet, or both. In any case, in accordance with principles known in the art, during power-on the processor 12 executes a basic input/output system (BIOS) program that may be stored in the memory 18, to load an operating system in the hard disk drive 40 into the memory 18.

Figure 2:
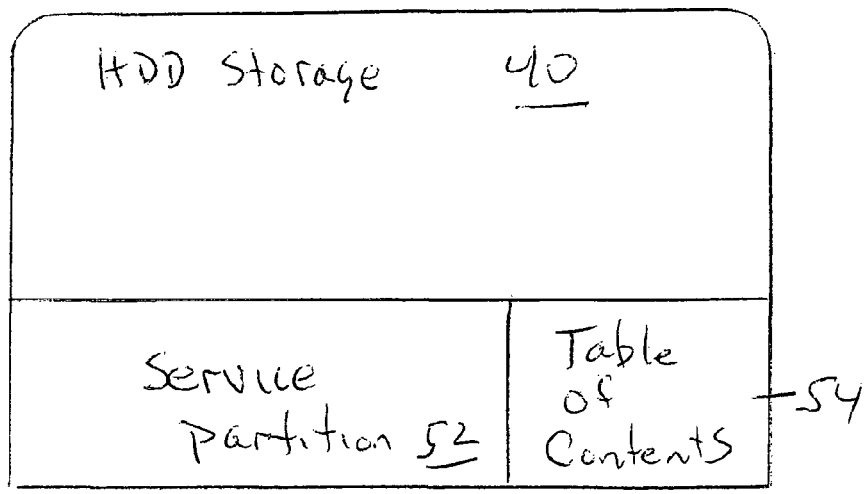
FIG. 2 is a schematic illustration of the storage area of a HDD, showing the service area.

Now referring to FIG. 2, details can be seen of the hard disk drive (HDD) 40 shown in FIG. 1 after processing in accordance with FIG. 3, discussed below. The HDD 40 includes a service partition 52 that contains certain basic system information, such as a compressed version of an operating system (e.g. Windows XP) installed on the HDD and, e.g., a "secure" or "service" O.S. that may be used for limited purposes for crash recovery, password reset, etc. The service partition 52 has a table of contents (TOC) 54, which allows the user to manipulate certain aspects of the service partition 52 at the appropriate time in accordance with logic below. The TOC 54 contains a list of various sectors within the HPA of the HDD 40 along with indicia such as starting block LBA representing their locations, it being understood that the HPA may be coterminous with the service partition 52.

Figure 3:
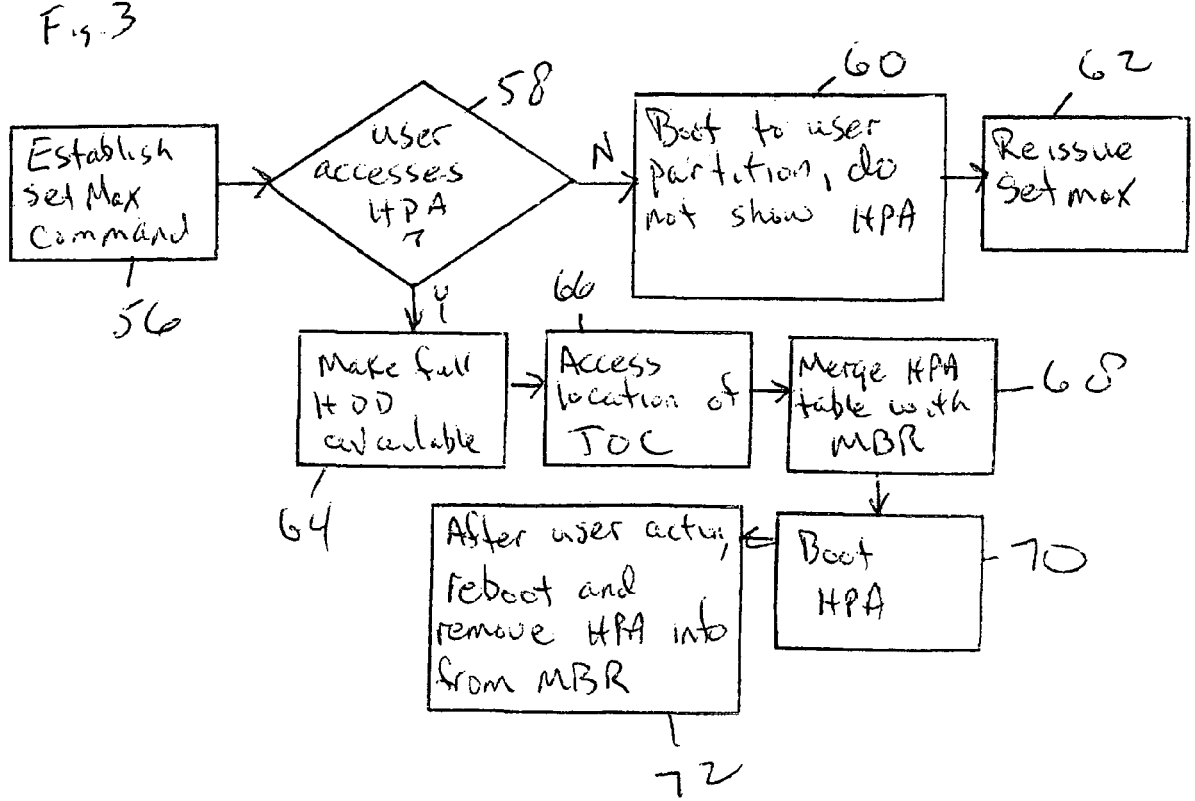
FIG. 3 is a flow chart of a non-limiting implementation of the present logic.

With more specificity and now referring to FIG. 3, a flow chart for accessing the protected HPA, which may be located at the beginning or end of the HDD for, e.g., system recovery, is shown for execution by, e.g., a basic input/output system (BIOS) and/or by executing code in the MBR of the HDD. While the logic is shown in flow chart format for exposition, state coding or other types of logical coding may be used in actual implementation.

Commencing at logic block 56, the system manufacturer establishes a SetMax command. The SetMax command is established so that the HPA partition 52 appears hidden or nonexistent on the HDD 40 once full system startup has occurred, protecting the HPA from destruction, virus infection, or any other damage that would affect system performance. Accordingly, the SetMax command includes data representing the boundary of the location of the HPA in any suitable format, e.g., by logical block address (LBA), sector/cylinder/head, etc., such that when SetMax is set, disk regions beyond the boundary defined in the SetMax command effectively are truncated, i.e., are not listed by the HDD as being part of the HDD when, for example, an operating system might query the HDD for its contents.

Moving to decision diamond 58, the logic determines whether the user wants to access the HPA. This access command can be input in many non-limiting ways, one of the most common being depressing the F11 key on an input device during the initial stages of system startup. If the user does not access the HPA, the logic moves to block 60 where the logic boots to the user's partition while not revealing the HPA portion. At block 62 the SetMax command is reissued so that the HPA cannot be accessed or even found on the HDD 40 during the remainder of system operation. In essence, the setmax command prevents the service partition table entries of the TOC in the HPA from being loaded into the MBR to thereby hide the HPA during normal operation, so that the HPA cannot be accessed or erased inadvertently by the user or by a virus.

Reverting back to decision diamond 58, if the user does need to access the HPA, the SetMax command is not issued by the system and the complete HDD is made available to the user at block 64. Once the full HDD has been made available, the logic then flows to block 66, where the logic accesses the location of the TOC 54 stored on the partition table 52. With the TOC located and read and, thus, the locations of its contents known, the logic moves to block 68 to merge a partition table from the HPA into, e.g., the Master Boot Record (MBR) of the HDD 40. This process can be executed in one of two ways, depending on the amount of space available on the partition table within the MBR. If the partition table within the MBR is full, the last entry in the partition may be replaced with the new partition table entry and marked as active, and the original content of the last entry can be stored in BIOS, non-volatile memory, or the MBR. After the service OS has booted, it can restore the original entry and mount that partition, thereby assigning it a drive letter for later use. However, if the partition table within the MBR has space available for the newest entry, the entry is inserted into the partition table and marked as active. It is to be understood that the partition table entry includes, among other things, a description of the partition, partition type, partition offset from the start of the disk storage, partition length, etc.

The logic then flows to block 70 where the HPA is booted up, making all partitions on the HDD available without SetMax limiting some of the parameters. The logic then concludes at logic block 72, where the user takes whatever action is desired, after which the system is rebooted. During system reboot, the HPA partition is removed from the MBR, SetMax is once again employed, and the HPA is protected.

While the particular SYSTEM AND METHOD FOR PROTECTING HIDDEN PROTECTED AREA OF HDD DURING OPERATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". For example, instead of a tactilely-manipulated special F11 key on a keyboard, the present access signal can be generated when a user "manipulates" a voice recognition input device by, e.g., speaking the word "access". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method comprising:
    establishing a service partition on a hard disk drive (HDD);
    configuring at least one control element selected from the group of: a basic input/output system (BIOS) of a computer, or a master boot record (MBR) of the HDD, to issue a command to the HDD not to indicate, to an operating system after the operating system has been booted for normal operation, the presence only of disk areas dedicated to the service partition, whereby the HDD is enabled to indicate the presence of all other disk areas; and
    configuring the control element not to issue the command if, during booting, a special input element is manipulated by the user to indicate a desire to access the service area.

2. The method of claim 1, wherein the command is a setmax command that instructs the HDD not to indicate the existence of the service area to the O.S.

3. The method of claim 2, wherein the input element is an F11 key on a keyboard or keypad.

4. The method of claim 1, wherein if the user manipulates the special input element during booting, the control element causes a partition table of the MBR to contain at least one service partition entry that points to the service partition.

5. The method of claim 4, wherein the service partition table entry is stored in the control element, and the control element can access a location of the service partition table entry to cause the partition table of the MBR to contain the service partition entry.

6. The method of claim 4, wherein if a partition table in the MBR is full, a last entry of the partition table is replaced by the service partition table entry, which is then designated as "active".

7. The method of claim 6, wherein the last entry that is replaced by the service partition table entry is stored in at least one storage selected from the group consisting of BIOS, non-volatile memory, and the MBR, and after an OS has booted, the last entry that was replaced by the service partition table entry is restored.

8. The method of claim 4, wherein if a partition table in the MBR is not full, an empty entry of the partition table is populated by the service partition table entry, which is then designated as "active".

9. A computer system comprising:
    at least one HDD including a service partition and an MBR; and
    at least one processor accessing a BIOS and MBR to boot an operating system (O.S.) on the HDD into a computer memory, the BIOS and/or MBR being configured to issue a setmax command to lock the service partition from being accessed by the O.S. during normal operation of the O.S., the setmax command being keyed to the service partition such that only disk sectors associated with the service partition are locked from being accessed, wherein if a partition table in the MBR is full, a last entry of the partition table is replaced by a service partition entry, which is then designated as "active".

10. The system of claim 9, wherein the BIOS or MBR does not issue a setmax command if a user manipulates a predetermined input element during system boot.

11. The system of claim 9, wherein if the user manipulates the input element during booting, the BIOS or MBR causes the partition table within the MBR to contain at least one service partition entry that points to the service partition.

12. The system of claim 11, wherein the service partition entry is stored in at least one location in the group consisting of BIOS, non-volatile storage, and MBR, and the BIOS or MBR can access a location of the service partition entry to cause the MBR to contain the service partition entry.

13. The system of claim 11, wherein if a partition table in the MBR is not full, an empty entry of the partition table is populated by the service partition entry, which is then designated as "active".

14. A HDD with at least one service partition entry stored in a service partition and loadable under control of BIOS into a master boot record (MBR) of the HDD, comprising:
    means for issuing a "setmax" command to prevent the service partition entry from being loaded into the MBR to thereby hide a hidden protected area (HPA) of the HDD during normal operation, so that the HPA cannot be accessed or erased inadvertently by the user or by a virus and
    means for, in response to the user pressing a special key during booting, for permitting access to the HPA.

15. The HDD of claim 14, wherein the service partition entry is stored in the service partition, and the BIOS can access a location of the service partition entry to cause the MBR to contain the service partition entry.

16. The HDD of claim 15, wherein if a partition table in the MBR is full, a last entry of the partition table is replaced by the service partition entry, which is then designated as "active".

17. The HDD of claim 16, wherein the last entry that is replaced by the service partition entry is stored in at least one storage selected from the group consisting of BIOS, non-volatile memory, and the MBR, and after an OS has booted, the last entry that was replaced by the service partition table entry is restored.

18. The HDD of claim 16, wherein if a partition table in the MBR is not full, an empty entry of the partition table is populated by the service partition entry, which is then designated as "active".

* * * * *